United States Patent [19]

Keough

[11] Patent Number: 4,933,233

[45] Date of Patent: Jun. 12, 1990

[54] FIRE RETARDANT FILM OF RADIATION CURED REACTION PRODUCT

[75] Inventor: Allen H. Keough, Sudbury, Mass.

[73] Assignee: Metallized Products, Inc., Winchester, Mass.

[21] Appl. No.: 187,847

[22] Filed: Apr. 29, 1988

[51] Int. Cl.$^5$ .............................................. C08K 3/10
[52] U.S. Cl. .................................. 428/328; 428/413; 428/423.7; 428/424.2; 428/461; 428/480; 428/500; 428/921; 524/409; 524/910; 524/913
[58] Field of Search ................. 428/500, 413, 423.7, 428/424.2, 461, 328, 921, 480

[56] References Cited

U.S. PATENT DOCUMENTS

| | | |
|---|---|---|
| Re. 31,214 | 4/1983 | Petrow et al. . |
| 3,639,232 | 2/1972 | Busch, Jr. . |
| 3,785,858 | 1/1974 | Chapin . |
| 3,860,523 | 1/1975 | Petrow et al. . |
| 3,910,977 | 10/1975 | Knowles . |
| 4,026,819 | 5/1977 | Langere et al. . |
| 4,120,798 | 10/1978 | Mischutin . |
| 4,123,475 | 10/1978 | Abolins et al. ................. 524/910 X |
| 4,158,077 | 6/1979 | Mischutin . |
| 4,169,104 | 9/1979 | Burt et al. . |
| 4,348,306 | 9/1982 | Mischutin . |
| 4,352,723 | 10/1982 | Morgan ............................ 522/182 |
| 4,353,961 | 10/1982 | Gotcher et al. ................ 524/409 X |
| 4,431,764 | 2/1984 | Yoshigumi ..................... 524/409 |
| 4,446,202 | 5/1984 | Mischutin . |
| 4,623,594 | 11/1986 | Keough . |
| 4,731,405 | 3/1988 | Kirsch et al. ................... 524/409 X |

*Primary Examiner*—Marion C. McCamish
*Attorney, Agent, or Firm*—Harness, Dickey & Pierce

[57] ABSTRACT

A fire retardant antistatic coating and coated substrate. The coating includes a mixture of a radiation curable halogenated prepolymer, an effective amount of a quarternary ammonium compound antistatic agent and an effective amount of an antimony pentoxide flame retardant agent. A coated substrate having a substrate film material coated with the above coating is included. A method for making a fire resistant and antistatic film which includes the steps of: (a) providing a substrate film; (b) preparing the coating by mixing a radiation curable prepolymer with an effective amount of a quarternary ammonium antistatic compound and an effective amount of an antimony pentoxide fire retardant compound; (c) the coating is then applied to the film material; and (d) the coating is contacted with electron radiation in an amount sufficient to cure the coating.

15 Claims, No Drawings

FIRE RETARDANT FILM OF RADIATION CURED REACTION PRODUCT

BACKGROUND OF THE INVENTION

The present invention relates to coatings and coated substrates material having fire retardant properties. More particularly, the present invention relates to a radiation cured fire retardant and antistatic coating, a substrate coated therewith, and to the method of making the coating and coated substrate. Preferably the substrate is a film.

The production of fireproof films which are antistatic and also resistant to fire is desirable. Particularly, in films such as nylons and others which tend to burn very rapidly, it is desirable to have fire retardant properties which would protect the users from the rapid burning of such films.

It is particularly desirable to provide a coating which can be readily applied and will be retained within the nylon film or other plastics for the life of the product.

Conventional attempts at fire proofing nylon and other film materials have been less than effective in that the coatings either wear off with time or do not provide the necessary self-extinguishing characteristics which are desirable in such a fireproofing compound.

Thus, in accordance with the present invention it has been found that a fire resistant nylon material or other film can be provided from a nylon substrate coated with a radiation curable composition including a flame retardant compound. Further understanding of the present invention will be had from the following disclosure wherein all parts and percentages are by weight unless otherwise indicated.

SUMMARY OF THE INVENTION

In accordance with a preferred embodiment of the present invention there is provided a fire retardant and antistatic coating for a film article which provides a self-extinguishing characteristic to said film. The coating comprises a mixture of a radiation curable halogenated monomer and prepolymer with an effective amount of a quaternary ammonium antistatic compound and an effective amount of an antimony pentoxide fire retardant agent. A fire resistant film is produced by applying the coating to the film material. The fire resistant and antistatic film material is made by a method comprising the steps of:

(a) providing a substrate sheet;

(b) preparing a flame retardant antistatic coating by mixing a radiation curable halogenated monomer and prepolymer with an effective amount of a quaternary ammonium antistatic compound and an effective amount of an antimony pentoxide fire retardant compound;

(c) applying said coating to said substrate textile sheet; and (d) contacting said coating with electron radiation in an amount sufficient to cure said coating.

DETAILED DESCRIPTION OF THE INVENTION

A preferred embodiment of a fire retardant and antistatic film made in accordance with the present invention is prepared from a substrate sheet material. The sheet material used may include any of the conventional plastic type materials wherein flame resistance and/or the combination of a flame resistant and an antistatic finished article is desirable. Preferred substrate sheets include: nylon, polyamide, polyester, polyethylene, polypropylene and the like. Alternatively, the substrate sheet may be of materials which are used to package computer disks wherein flame resistance and antistatic properties are desirable.

The coating to be applied on at least one side of the sheet material comprises a solution of an electron radiation curable monomer/prepolymer mixture with an effective amount of an antistatic agent and a flame proofing agent dispenser therein.

Radiation curable resin halogen monomer and prepolymers suitable for use herein are commercially available and known in the art. The radiation curable halogenated monomer/prepolymer resin mixture of this invention comprises a mixture of at least one difunctional oligomer and at least one difunctional monomer. Generally speaking, the oligomer constitutes the backbone of a radiation curable coating and largely determines the physical characteristics of the finally-cured coating. A suitable difunctional monomer includes: diallyl chlorendate, having the chemical structure.

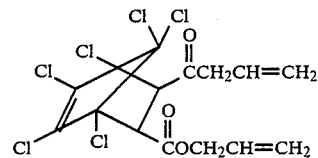

The difunctional oligomer is used in conjunction with a difunctional monomer. The difunctional monomer provides the flexibility the coating requires. An example of a suitable di-functional oligomer includes: a diacrylate ester of the diglycidyl ether of tetrabromo bisphenol A.

Antistatic agents suitable for use herein are soluble in the resin precursor mixture. The antistatic agent is a saturated quaternary ammonium salt such as trialkylalkyletherammonium salts. A preferred salt is a trialkylalkyletherammonium salt wherein each of the trialkyl groups has from 1 to about 3 carbon atoms, the alkylether group has an alkyl group having from about 4 to about 18 carbon atoms, and the ether group is selected from the group consisting of ethylene oxide and propylene oxide. An example of a preferred salt is triethylalkyletherammonium sulfate, commercially available as Emerstat 6660 from Emery Industries. Another example of a preferred salt is lauryl dimethyl ethyl ammonium etho sulfate available as Larostat 377 DPG from Jordan Chemical. The antistatic agent is mixed with the radiation curable resin precursor mixture in an amount effective to obtain the desired antistatic characteristics for the product. The exact amount will vary from resin to resin, antistatic agent to antistatic agent, and intended use for the resulting product.

The flame retardant agent suitable for use herein is an antimony pentoxide flame retardant compound and is preferably a colloidal dispersion of antimony pentoxide in a suitable resin vehicle such as a polyester resin. More preferably, the colloidal dispersion comprises about 40 parts of antimony pentoxide in about 60 parts polyester resin vehicle.

The particle size of the antimony pentoxide used in the present invention is chosen depending on the desired or necessary loading up of the coating in the final textile product. Preferably, the particle size of the antimony pentoxide used in the present invention is from about 0.015 microns to about 0.030 microns.

It has been found that the ratio of the colloidal dispersion to the halogenated monomer/oligomer provides the necessary fire retardant characteristics in the final product. This colloidal dispersion was so chosen to preserve high clarity and transparency in the fire retardant films. Conventional antimony oxides such as the widely used antimony trioxide are commercially available in only particle sizes of 1–3 microns which when dispersed in coating vehicles impart a cloudy, hazy or even opaque appearance to the coated film materials.

The coating composition is applied to the substrate sheet surface as a solution comprising a monomer/prepolymer mixture, an antistatic agent, and a flame retardant agent and is then cured in situ by means of electron beam radiation. The coating need be applied and cured on only one side of the substrate. Coating of the antistatic compositions of the present invention onto the textile substrate sheet can be done in any conventional manner. The coating can be applied by dip coating, air-knife coating, roll coating, gravure coating, reverse gravure coating, extrusion coating, bead coating, curtain coating, use of wire wound coating rods, and so forth. The coating deposited on the substrate is effective even as a thin coating having a thickness on the order of from 0.1 to 0.2 mils. Of course, the viscosity of the coating composition can vary widely depending upon the method of coating which is chosen and the desired end results. Typical viscosity of coatings may range from 500 to about 5000 centipoise. Typical coating weights are from about 1 to 3 pounds per ream.

Apparatus and methods for curing of the radiation curable antistatic resin composition are well known and any suitable electron radiation curing process and apparatus can be used in carrying out this invention. Conventional electron radiation curing processors use a linear cathode unscanned accelerator and generate a continuous unscanned "waterfall" of high energy electrons, typically in the 100 to 200 kilovolt range. Suitable apparatus are commercially available from Energy Sciences, Inc. of Woburn, Mass., under the tradename Electrocurtain. Examples of suitable apparatus are disclosed in U.S. Pat. Nos. 3,702,412, Nov. 7, 1972 to Quintal; 3,769,600, Oct. 30, 1973 to Denholm et al.; and 3,780,308, Dec. 18, 1973 to Nablo. High energy ionizing radiation such as electron beam radiation should be used in sufficient intensity to penetrate substantially all the way through the coating composition to break carbon-carbon double bonds and to cure the coating by initiating polymerization. Typically dosages in the range of from about 1 to 6 megarads are employed. Upon contacting the antistatic resin composition with radiation of sufficient intensity to cure same, the composition used in the present invention is substantially completely converted to a cured coating.

The flame retardant film product, when made in accordance with the present invention, has been found to provide several advantages over prior flame proofing compounds and/or films produced therefrom. The coating of the present invention is fire retardant and static dissipative in its final form. Additionally, the coating is transparent and flexible in its final cured form. And in particular, the nylon film treated with the coating of the present invention has been tested and passed the NASA flammability test.

Further understanding of the present invention will be had from the following example.

EXAMPLE I

Liquid solutions embodying the teachings of the present invention were prepared and labeled 112-73A; 112-73B; and 112-73C. The components of these solutions and mixtures by parts are shown in Table I below.

TABLE I

|  | 112-73A | 112-73B | 112-73C |
| --- | --- | --- | --- |
| (SR-383 from the Sartomar Company) (diallyl chlorendate) | 23.0 | 18.0 | 25.7 |
| RDX 56843 (from Interez Corporation) (the diacrylate ester of the diglycidylo ether of tetrabromo b is phenol A) | 44.0 | 40.0 | 47.0 |
| EMERSTAT 6660 from Emery Industries (triethyl alkyletherammonium sulfate) | 12.0 | 10.0 | 12.0 |
| DC - 193(from Dow Corning) (silicone surface of active agent) | 0.3 | — | 0.3 |
| AGO - 40(from Nyacol Corp) (a colloidal dispersion of 40 parts antimony pentoxide in 60 parts of a polyester resin vehicle) | 20.7 | 30.0 | 15.0 |
| PETA (pentaerythritoltriacrylate) | — | 2.0 | — |

The above coatings were then applied to 2 mil thickness of a Capran polyamide film and cured using the parameters as set forth in Table II. The resulting products were tested for surface resistivity and were fire tested for flame resistance. The results of this test are also summarized in Table II below.

TABLE II

| COATING | CYL | SPEED | DOSE | SURFACE REACTIVITY (COATED SIDE/ UNCOATED SIDE) | FIRE TEST |
| --- | --- | --- | --- | --- | --- |
| 112-73A | 150 | 50 ft./min. | 3 Mrads | $1.68 \times 10^{11}$/ $9.744 \times 10^{11}$ | Burns 1.5" |
| 112-73B | 150 | 50 ft./min. | 3 Mrads | $1.54 \times 10''$/ $2.296 \times 10^{11}$ | Does not ignite; burns ¾" |
| 112-73C | 150 | 50 ft./min. | 3 Mrads | $2.24 \times 10^{11}$/ $3.696 \times 10^{12}$ | Does not ignite; flames out immediately |
| 112-73C | 200 | 50 ft./min. | 3 Mrads | $1.848 \times 10^{11}$/ $5.264 \times 10^{11}$ | Does not ignite; flames out immediately |
| 112-73A | 200 | 50 ft./min. | 3 Mrads | $2.05 \times 10^{11}$/ $9.576 \times 10^{11}$ | Does not ignite; flames out immediately |

What is claimed is:

1. A fire retardant antistatic film which has self extinguishing characteristics comprising:
   (a) a substrate film material;

(b) a continuous coating on said substrate film material, said continuous coating comprising the radiation cured product of a radiation curable mixture of at least one halogenated difunctional oligomer and at least one halogenated difunctional monomer an effective amount of a quaternary ammonium compound antistatic agent and an effective amount of an antimony pentoxide flame retardant agent.

2. The fire retardant antistatic film of claim 1 wherein said substrate film material is selected from the group consisting of nylon, polyamide, polyester, polyethylene, and polypropylene.

3. The fire retardant antistatic film of claim 1 wherein said antimony pentoxide flame retardant agent further comprises a colloidal dispersion of antimony pentoxide in a suitable resin vehicle.

4. The fire retardant antistatic film of claim 3 wherein said suitable resin vehicle is a polyester resin.

5. The fire retardant antistatic film of claim 4 wherein said colloidal dispersion comprises about 40 parts of said antimony pentoxide in about 60 parts polyester resin vehicle.

6. The fire retardant antistatic film of claim 1 wherein said mixture of said halogenated oligomer and said halogenated monomer further comprises either a chlorinated monomer, a brominated oligomer or a mixture thereof.

7. The fire retardant antistatic film of claim 1 wherein said halogenated monomer comprises a diallyl chlorendate and said halogenated oligomer comprises the diacrylate ester of the diglycidyl ether of tetrabromo bis-phenol A.

8. The fire retardant antistatic film of claim 3 wherein said antimony pentoxide is in a particulate form and has a particle size of from about 0.015 microns to about 0.030 microns.

9. A fire retardant and antistatic coating for a film comprising a mixture of:
  (a) a radiation curable mixture of a halogenated difunctional oligomer and a halogenated difunctional monomer;
  (b) an effective amount of a quaternary ammonium antistatic compound; and
  (c) an effective amount of an antimony pentoxide fire retardant agent.

10. The fire retardant and antistatic coating of claim 9 wherein the antimony pentoxide agent is a colloidal dispersion of antimony pentoxide in a suitable resin binder.

11. The fire retardant and antistatic coating of claim 10 wherein the suitable resin comprises a polyester resin.

12. The fire retardant and antistatic coating of claim 11 wherein said colloidal dispersion comprises about 40 parts antimony pentoxide in about 60 parts polyester resin.

13. The fire retardant and antistatic coating of claim 12 wherein said antimony pentoxide is particulate in form and has a particle size in the range of from about 0.015 microns to about 0.030 microns.

14. The fire retardant and antistatic coating of claim 9 wherein said radiation curable mixture further comprises a chlorinated monomer in mixture with a brominated oligomer.

15. The fire retardant and antistatic coating of claim 14 wherein said chlorinated monomer is a diallyl chlorendate and said brominated oligomer is a diacrylate ester of the diglycidyl ether of tetrabromo bis-phenol A.

* * * * *

UNITED STATES PATENT AND TRADEMARK OFFICE
CERTIFICATE OF CORRECTION

PATENT NO. : 4,933,233

DATED : June 12, 1990

INVENTOR(S) : Allen H. Keough

It is certified that error appears in the above-identified patent and that said Letters Patent is hereby corrected as shown below:

ON THE TITLE PAGE:
  Abstract, lines 3-4, "quarternary" should be --quaternary--

Abstract, lines 11-12, "quarternary" should be --quaternary--

Column 2, line 22, "structure." should be --structure--

Table II:
Column 4, line 53, ' 1.54 x 10" ' should be --1.54 x $10^{11}$--

Column 2, line 5, "monomer" should be --monomer,--

Signed and Sealed this

Thirteenth Day of October, 1992

*Attest:*

DOUGLAS B. COMER

*Attesting Officer*     *Acting Commissioner of Patents and Trademarks*